Patented Feb. 2, 1937

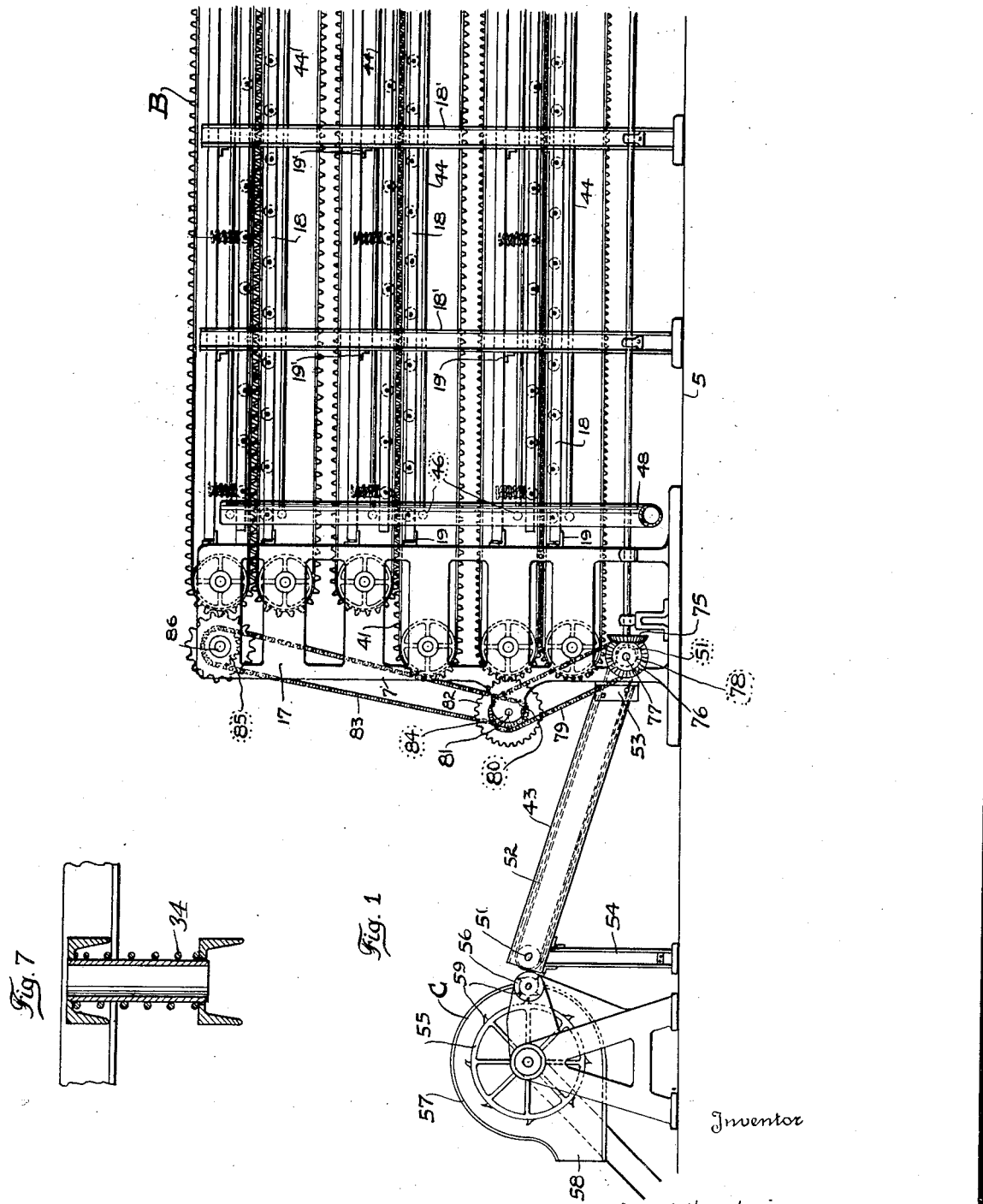

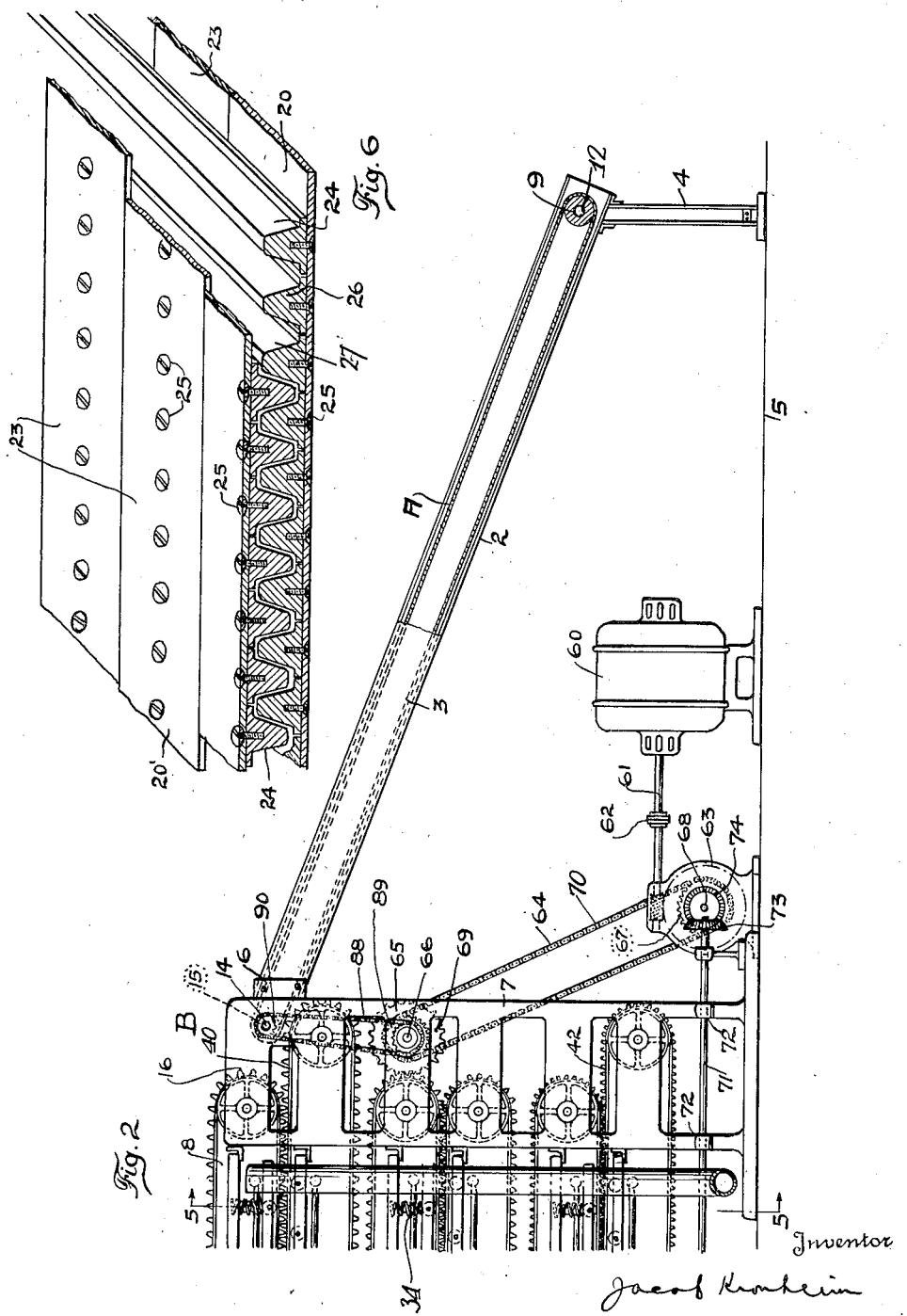

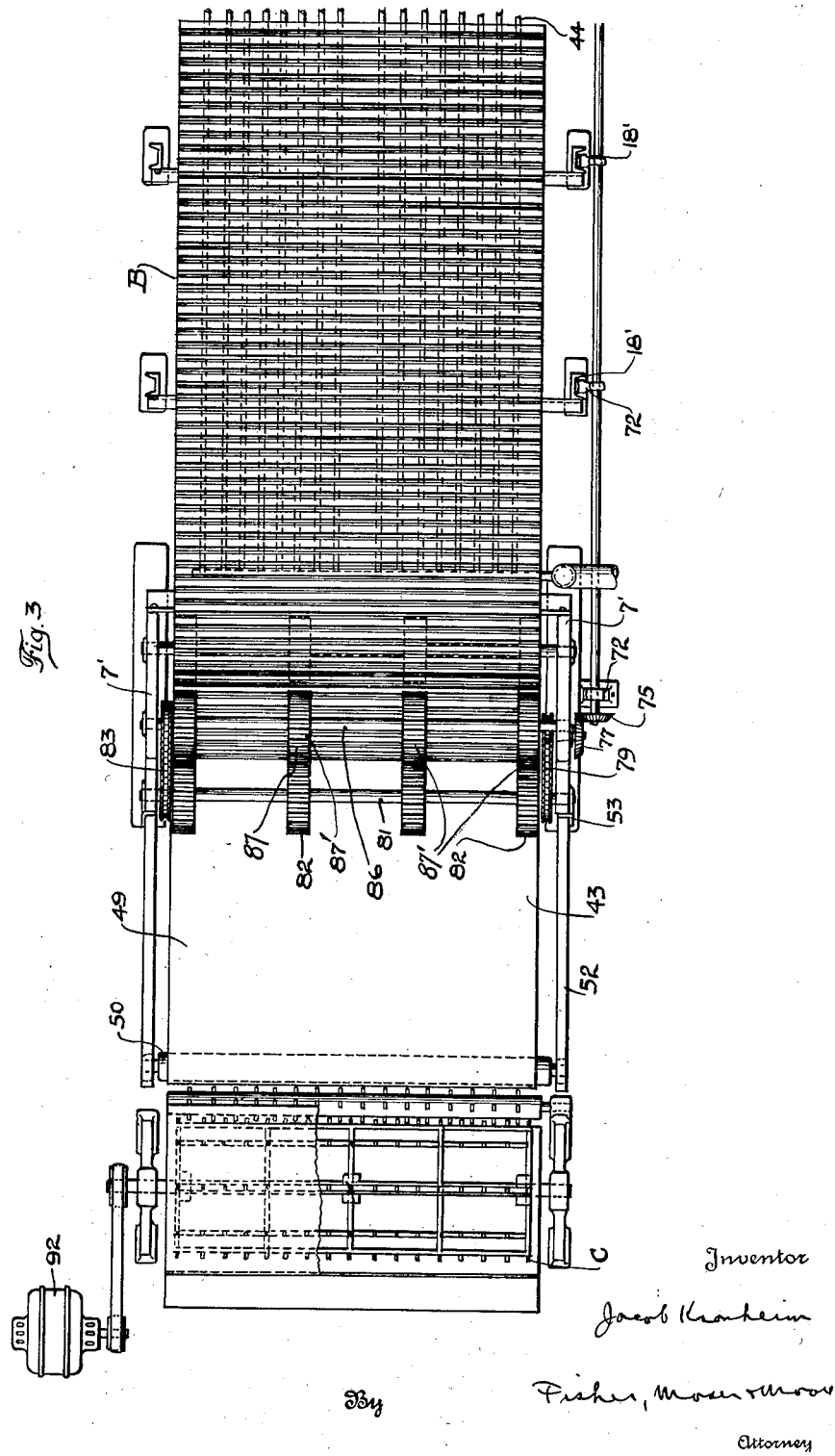

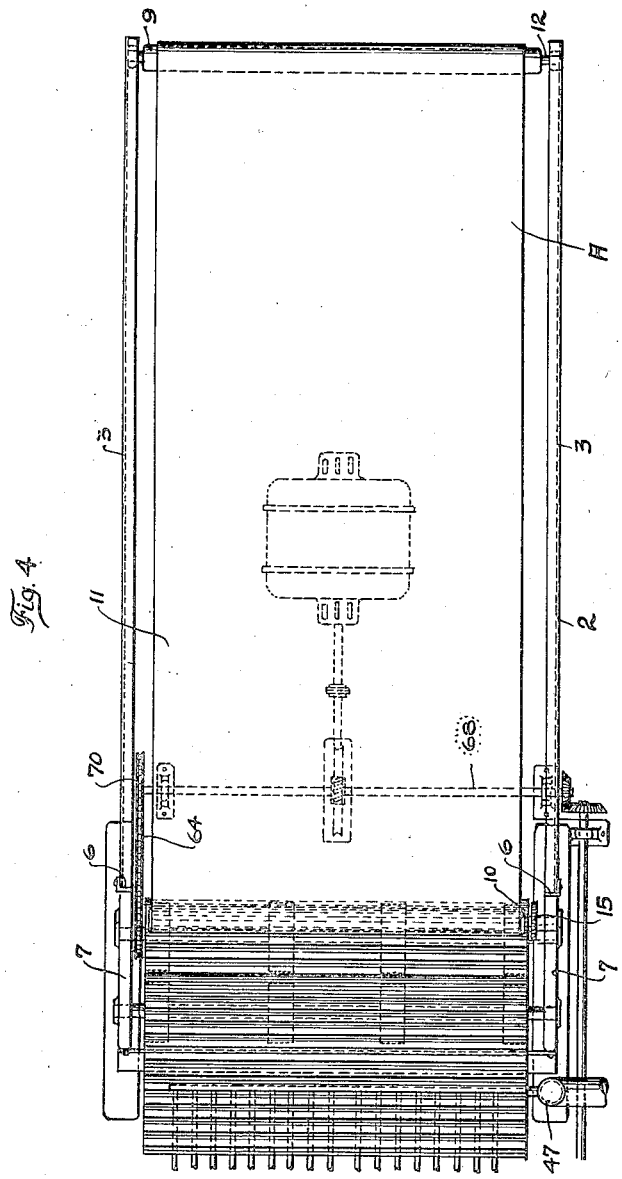

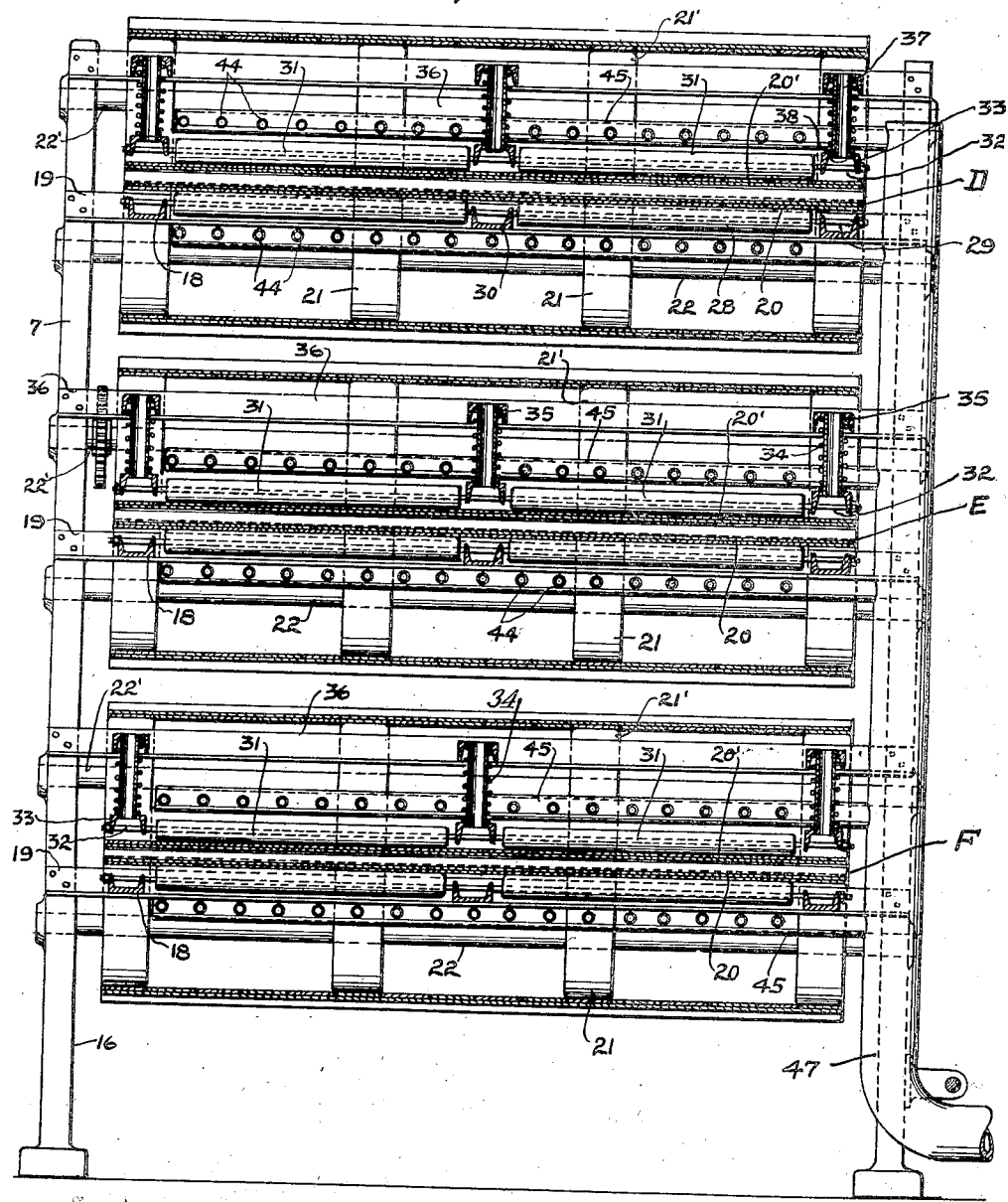

2,069,412

UNITED STATES PATENT OFFICE 2,069,412

MACHINE FOR MAKING STUFFING FOR FURNITURE

Jacob Kronheim, Cleveland, Ohio

Application August 1, 1933, Serial No. 683,224

4 Claims. (Cl. 19—66)

My invention relates in general to stuffing for chairs, cushions, mattresses and the like and more particularly to sanitary, strong, durable, resilient, fibrous stuffing materials, which will not pack, gather and/or grind up in use. Such stuffing can readily be made from strips or strands of fibrous material, curled while wet, dried and finally pulled or picked apart to impart the desired fluffiness to the material.

The general object of the present invention is to provide a machine for economically and continuously producing a stuffing of the kind referred to above which will be ready for immediate use as it leaves the machine.

Another object is to provide a machine for producing a stuffing of the kind referred to including means for curling and drying the material simultaneously while the material is being advanced through the machine.

Still another object is to provide a machine of the kind referred to with individual curling and drying sections for curling the material with coarse and fine waves and drying the material while being continuously advanced through the sections.

A further object is to provide a machine of the kind referred to which includes continuously advancing elongated curling and drying means for curling and drying the material for a substantial time interval while the material is continuously advancing.

Still a further object is to provide a machine of the kind referred to including a plurality of sections for imparting fine and coarse waves to and drying the material for a substantial time interval while being continuously advanced through said sections, and means for pulling and picking the curled and dried material.

With the above objects in view and in order that those skilled in this art may have a full and complete understanding of the structural and functional advantages of a machine embodying this invention and in order that the attainment of other desirable objects may be indicated, I have illustrated in the accompanying drawings a preferred embodiment of the invention and throughout the various views of these drawings like reference characters refer to the same parts.

In the accompanying drawings:

Figures 1 and 2 show a side view of a machine according to the invention which continuously produces the finished stuffing from fibrous raw material fed thereinto.

Figures 3 and 4 show a plan view of the machine shown in Figures 1 and 2;

Figure 5 is an enlarged cross sectional view on line 5—5 of Figure 2;

Figure 6 is an enlarged fragmentary perspective view of the belt-shaped curling means of the machine; and Fig. 7 is a cross-sectional view showing the connection between the fixed and yieldingly supported channels.

The machine herein described, which is particularly designed to produce a resilient, fibrous stuffing material in a continuous manner, comprises a feed conveyor A, a curling and drying section B and a picking device C for picking the curled and dried material. The upwardly inclined feeding conveyor A, transfers the fibrous, wet and preferably dyed material to the curling and drying section B. This conveyor comprises a frame 2 of laterally spaced channel irons 3 having at their outer ends legs 4, which are preferably mounted in a foundation 5, extending lengthwise of the machine. The inner ends of channels 3 are connected to and supported by laterally extending angular brackets 6, secured by riveting or the like to oppositely arranged standards or frame members 7 of main frame 8 of the curling and drying section B. The outer ends of said channels 3 rotatably support an idler roller 9, frame members 7 of main frame 8 rotatably support a driven roller 10, and mounted upon these rollers 9 and 10 is an endless conveyor belt 11. The shaft 12 of idler roller 9 is stationary, whereas the shaft 14 of driven roller 10 is rotatably supported and carries at the left side of the machine a driving sprocket wheel 15.

The fibrous material is carried by conveyor A to the curling and drying section B and then simultaneously curled and dried, while advancing through said section. The main frame 8 of this section consists of two frame structures 16 and 17, embodying a pair of frame members 7, 7' respectively, which members are oppositely arranged with respect to each other. The frame structures are mounted on foundation 5 and longitudinally aligned and spaced with respect to each other by channel irons 18, secured to frame members 7, 7' and to channeled uprights 18' by means of angle irons 19, 19' respectively. The thus formed box-shaped frame structure 8 rotatably supports a plurality of endless flexible curling and conveying members D, E and F. These conveying members consist of three pairs of flexible curling members, each of which includes two cooperating endless curling and conveying chains 20, 20' respectively, which are arranged one above the other and have their opposite ends rotatably supported in frame structures 16 and 17. Chains 20, 20' of each curling and conveying member engage with each other and are supported and guided by a series of idle rollers 21, 21' rotatably supported on shafts 22, 22', which shafts are mounted in frame structures 16 and 17 respectively. These curling chains or belts embody a flexible base member, including a plurality of individual endless flexible, metal bands 23. These bands are arranged side by side and form an endless metal belt of substantial flexibility which can readily and easily be carried around rollers 21, 21' and will not stretch under stresses. The flexible bands 23 are connected with each other by a series of approximately triangularly shaped cross rods 24, bridging said bands and secured thereto by means of headed, countersunk screws 25. These rods are provided with widened base portions 26 abutting each other for stiffening and reinforcing the flexible base member and permit application of substantial pressure to these chains without decreasing the flexibility thereof when riding around idle rollers 21, 21'. The outer surface of thus formed curling chains is transversely corrugated and provided with curling ribs and grooves 26 and 27 respectively and the inner surface of said chains is smooth and can readily be utilized for guiding and supporting these chains and shifting same in upwardly or downwardly direction.

The two cooperating curling chains of each set of flexible curling members D, E and F are arranged above each other so that the ribs and grooves of adjoining flights interengage with each other and cause even travel of the chains when propelled. Each rod 24 of a chain 20 remains in mesh with the corresponding grooves 26 of the cooperating chain 20' and vice versa for approximately the entire length of the flights of these chains. Therefore material fed between two cooperating chains is subjected to curling pressure for a substantial time interval, while successively passing through the three curling and converging members D, E and F. The weight of the upper curling chain 20' is in many cases sufficient to apply the desired pressure to the material to be curled, but preferably special means are provided to increase this pressure. In order to obtain this desideratum, and to effect continuous mesh of the flights of cooperating endless chains 20, 20' respectively, the upper flight of chain 20 of each curling and conveying member is guided to travel in a horizontal course while in contact with the lower flight of chain 20'. To that effect chain 20 with its inner smooth surface engages a series of rollers 28, rotatably mounted on shafts 29, which are secured to and supported by the channels 18. As shown there are two rollers on each shaft 29, to permit shaft 29 to be centrally supported in a channel iron 30 arranged between and parallel to channels 18 and supported by and connected with angle irons 19. This arrangement insures constant, intimate contact of the meshing flights of chain 20 and 20'.

The upper chain 20' is yieldingly forced into engagement with lower chain 20 by means of a series of rollers 31 engaging the smooth inner surface of the lower flight of chain 20'. Rollers 31 are rotatably mounted on shafts 32, which are secured to yieldingly supported channels 33 to permit yielding upward movement of said rollers and the lower flight of chain 20' contacting with said rollers, when thicker layers of material should be fed into the curling and drying section B. These channels 33 are forced downwardly by compression springs 34, resting with one end upon the back face of said channels and seated with their opposite ends in channels 35 arranged in spaced relation parallel to and above channels 33 and secured to angle irons 36, which are attached at their opposite ends to frame members 7, 7' and/or uprights 18'. The springs 34 are preferably guided by short tubes 37 axially extending therethrough. These tubes are at one end secured to the channels 35 and extend with their other ends through openings 38 in the web portions of channels 33.

The material fed to the curling section by conveyor A is subjected to curling pressure while successively passing through the three curling and conveying members D, E and F thereof. To facilitate feeding operations from conveyor A to member D, hence to member E and finally to member F, the lower curling chains 20 of each of said members are longer than their cooperating upper curling chains 20' and extend at the receiving ends of the respective curling and conveying members D, E and F beyond the chains 20' thereof. The extending portions of chains 20 form moving platforms 40, 41 and 42 respectively, which feed the material to the curling and conveying members. Thus material carried on conveyor A to the curling and drying section B is discharged upon platform 40 which feeds said material into curling and conveying member D, material having passed through member D is discharged upon platform 41, feeding said material into curling and conveying member E and material having passed through member E is discharged upon platform 42, and then advances into and through curling and conveying member F, and is finally discharged upon a belt conveyor 43. The curling and conveying members D and F advance in the same direction, whereas the curling and conveying member E advances in an opposite direction and platforms 40 and 42 are located at the same end of section B, whereas platform 41 is located at the opposite end of said section. This arrangement causes a continuous travel of the material successively through conveying and curling members D, E and F.

The cross section of rods 24 secured to the metal bands 23 of chains 20 and 20' differ in all three curling and conveying members. Preferably as shown in Figs. 1 and 2 the cross section of these rods in member D is substantially larger than is member E and the cross section of rods 24 in member E is substantially larger than in member F so that the material passing through the curling section B is curled three times and impressed with the fine curls when passing through the member F. This arrangement insures delivery of properly curled material to conveyor 43, which conveys the material to the picking and delivery section C hereinafter described.

It is essential that the raw material be subjected to both heat and pressure in order to produce the desired curling effect. The pressure as previously described is exerted by the curling chains 20, 20', and the heat is supplied by a plurality of steam pipes 44 extending longitudinally between the flights of each of the chains 20 and 20'. Steam pipes 44 communicate at opposite ends with headers 45, 46 extending transversely through the space between the flights of the curling chains close to the opposite ends thereof, which headers in turn communicate with a main supply pipe 47 and a collector pipe 48. These latter pipes communicate according to common practice with a boiler, not shown, to effect proper heating of pipes 44. Main supply pipe 47 and its headers 45 are arranged at the end of the curling section so that the material before leaving said section is subjected to the greatest heat and is discharged from the curling section properly curled and dried.

After the material has been curled and dried in the continuous manner previously described, said material is conveyed to the picking and delivery section C by means of endless belt 49 of conveyor 43, which operates over an idler roller 50 and a driven roller 51. Roller 50 is mounted in the outer ends of a pair of channel irons 52 secured at their inner ends to frame structure 17 by means of angular brackets 53, and supported at their outer ends by legs 54. Conveyor 43 delivers the curled and dried material to the pulling and picking device C, arranged in alignment with and adjoining the discharge end of said conveyor. This device which is of common design embodies two oppositely rotating picking rolls 55 and 56, arranged in a housing 57, having at one side thereof an elongated discharge opening 58 through which the finished product is discharged. The rotating picking rolls 55 and 56 carry a plurality of picking teeth 59 adapted to separate or split the material longitudinally into a multiplicity of fine fibers or threads and to change the previously curled, dried and hardened material into a curly, fluffy product of inherent resiliency. According to common practice in picking devices of the kind shown, rolls 55 and 56 rotate with different speed and are of different size to more readily accomplish the desired results.

The machine thus described is driven by an electric motor 60. This motor is coupled by means of a shaft 61, including a coupling member 62, with a reduction unit 63 which in turn is coupled with the curling and conveying member E of the curling section B by means of a chain drive 64, arranged at the right side of the machine which drive rotates a series of gears 65 meshing with conveyor chain 20' of curling and conveying member E. These gears 65 are mounted on a shaft 66 rotatably mounted in frame structure 16. Chain drive 64 embodies a sprocket wheel 67, rigidly connected to one end of elongated shaft 68 of reduction unit 63, a sprocket wheel 69 rigidly connected to shaft 66 of driving cylinder 65 and a chain 70. The reduction unit 63 reduces the speed of gears 65 relative to that of the motor 60 so that the chain 20' of curling and conveying member E advances with the desired speed. Reduction unit 63 is also coupled with the curling and conveying member F of the curling section B by means of an elongated shaft 71 and a chain drive. Shaft 71 is mounted in bearings 72 at the lower left side portion of section B and carries at one end a bevel gear 73 meshing a bevel gear 74 on shaft 68 of reduction unit 63 and at its opposite end a bevel gear 75 meshing a bevel gear 76 mounted at one end of a shaft 77, which shaft is pivotally secured to frame members 7' of frame structure 17. This shaft 77 carries a sprocket wheel 78 which by means of chain 79 drives a sprocket wheel 80 rigidly secured to the shaft 81 supporting a plurality of driving gears 82 meshing chain 20' of curling and conveying member F. The curling and conveying member D is driven from shaft 81 by means of a chain 83 and sprockets 84 and 85 secured to shaft 81 and shaft 86 respectively mounting a series of gears 87' which mesh and drive curling chain 20' of curling and conveying member D.

The speed of travel of endless conveyor belt 11, the curling chains 20, 20' of the conveying and curling members D, E and F and of the endless belt 49 are timed relatively to each other, in order to insure the feeding of proper amount of treated material to each of said conveying and curling members D, E and F and to the picking device C. Conveyor belt 11 must travel much faster than the relative travel of member D, where the material is subjected to a corrugating, curling action and therefore greatly decreased in length in comparison to that of the material before being corrugated. Of course the extent of the corrugating surface of the curling chains 20, 20' of this member must be taken into consideration when determining the necessary speeds of conveyor belt 11 and chains 20, 20' of conveying and curling member D. Furthermore the relative speeds of the conveying and curling member D must be faster than that of curling member E and the latter member must travel faster than the curling member F to make up for the decrease in length by curling when the material passes through these members. Unless the relative speeds of travel are properly gauged the material will either buckle or the continuity of the stream of material being fed to these members will be broken. On the other hand the speed of travel of conveyor belt 49 must be approximately equal to that of travel of the conveying and curling member F, to prevent stretching of the curled material in front of the pulling and picking device C. To that effect there is provided a chain 88 between shaft 66 and conveyor 11, which engages a sprocket wheel 89 in shaft 66 and a sprocket wheel 90 mounted on shaft 14 of driven roller 10 of conveyor A. Conveyor belt 49 is directly driven through shaft 77, which shaft is rigidly connected with the driven roller 51 of said conveyor. The pulling and picking device C is driven by a separate motor 92, so that the speed of picking rolls 55 and 56 can be conveniently adjusted.

The operation of the machine is as follows: When the steam pipes 44 have sufficiently heated chains 20, 20' of the curling and conveying members D, E and F, the moist raw material is manually or automatically fed to and upon conveyor 11, which carries said material to platform 40 of curling and conveying section D. This material is then automatically advanced to and through section D, discharged upon platform 41 of curling and conveying section E, advanced in opposite direction to and through section E, discharged upon platform 42 of curling and conveying section F and advanced to and through section F. After being discharged from said last section the properly curled and dried material is conveyed to the pulling and picking device C, where said material is pulled and picked apart and finally discharged through discharge opening 58.

Having thus described my invention:
What I claim is:

1. In a machine for making stuffing for chairs, couches etc. from fibrous material, a curling section including superposed cooperating cross-wise corrugated endless conveyor belts arranged in close relationship with respect to each other, the inner surface of said conveyor belts being smooth, and a plurality of spring pressed rollers within the space between the flights of one of said conveyor belts contacting with the inner smooth surface thereof for guiding same and forcing one flight of the belt yieldingly towards the operating flight of another belt.

2. In a machine for making stuffing for chairs, couches etc. from fibrous material, a curling section including cooperating endless conveyor belts, having their outer surface cross wise corrugated, said belts being superposed to bring their flights in close relationship with respect to each other and effect driving engagement of the opposed flights of said belts, and driving means for one of said conveyor belts in driving connection with the corrugated outer surface of said belt.

3. In a machine for making stuffing for upholstery from fibrous material, comprising a curling section including co-operating cross-wise corrugated endless conveyor belts arranged one above the other in close relationship with respect to each other, the inner surfaces of said conveyor belts being smooth, and spring pressed means within the space between the flights of the upper conveyor belt and engaging the inner smooth surface of the lower flight for guiding the same and causing an even yielding pressure of the said flight towards the upper flight of the conveyor directly below.

4. In a machine for making stuffing for upholstery from fibrous material, comprising a curling section including corrugated endless conveyor belts arranged one above the other in close relationship with respect to each other and spring actuated rollers engaging the inner face of the lower flight of the upper conveyor and forcing it towards the upper flight of the conveyor directly below, and having means for drying the fibrous material in its travel between the flights of the belts.

JACOB KRONHEIM.